United States Patent
Trossen et al.

(10) Patent No.: US 9,419,926 B2
(45) Date of Patent: *Aug. 16, 2016

(54) SYSTEM, METHOD AND COMPUTER PROGRAM PRODUCT FOR THE DELIVERY OF MEDIA CONTENT

(71) Applicant: Core Wireless Licensing S.A.R.L., Luxembourg (LU)

(72) Inventors: Dirk Trossen, Cambridge, MA (US); Hemant M. Chaskar, Woburn, MA (US)

(73) Assignee: Core Wireless Licensing S.A.R.L., Luxembourg (LU)

(*) Notice: Subject to any disclaimer, the term of this patent is extended or adjusted under 35 U.S.C. 154(b) by 257 days.

This patent is subject to a terminal disclaimer.

(21) Appl. No.: 14/149,854

(22) Filed: Jan. 8, 2014

(65) Prior Publication Data

US 2014/0122630 A1 May 1, 2014

Related U.S. Application Data

(63) Continuation of application No. 10/313,489, filed on Dec. 6, 2002, now Pat. No. 8,645,470.

(51) Int. Cl.
*G06F 15/16* (2006.01)
*H04L 12/58* (2006.01)
*H04W 4/12* (2009.01)
*H04W 4/18* (2009.01)
*H04W 8/18* (2009.01)
*H04W 88/18* (2009.01)
*H04W 92/02* (2009.01)

(52) U.S. Cl.
CPC .......... *H04L 51/10* (2013.01); *H04W 4/12* (2013.01); *H04W 4/18* (2013.01); *H04W 8/18* (2013.01); *H04W 88/184* (2013.01); *H04W 92/02* (2013.01)

(58) Field of Classification Search
USPC .......................................... 709/206, 224, 238
See application file for complete search history.

(56) References Cited

U.S. PATENT DOCUMENTS

| 5,493,692 | A | * | 2/1996 | Theimer | G06Q 10/107 709/206 |
| 5,928,325 | A | * | 7/1999 | Shaughnessy | G06Q 10/107 709/206 |
| 6,594,699 | B1 | * | 7/2003 | Sahai | H04L 29/06027 709/228 |
| 6,938,080 | B1 | * | 8/2005 | Kahveci | H04L 12/14 709/203 |
| 7,886,007 | B2 | * | 2/2011 | Kuisma | H04L 12/587 709/206 |
| 8,645,470 | B2 | * | 2/2014 | Trossen | H04W 4/12 709/206 |
| 2002/0087549 | A1 | * | 7/2002 | Mostafa | H04L 12/587 707/999.01 |

* cited by examiner

*Primary Examiner* — Philip B Tran
(74) *Attorney, Agent, or Firm* — Core Wireless Licensing, Ltd.

(57) ABSTRACT

A system, method and computer program product are provided for delivering media content. The system includes at least one recipient that may be associated with at least one recipient rule. The system also includes a sending entity capable of transmitting a multimedia message addressed to the recipients. The sending entity can also specify delivery rules in the message. In this regard, the multimedia message includes media content. The system further includes a network entity capable of receiving the multimedia message and identifying any recipient rules, sending entity rules and/or network rules associated with the multimedia message. The network entity can then deliver the media content to the recipients based upon respective rules. The network entity can also be capable of processing the media content based upon the rules before delivering the media content, such as by transcoding or truncating at least a portion of the media content prior to delivery.

20 Claims, 5 Drawing Sheets

SYSTEM, METHOD AND COMPUTER PROGRAM PRODUCT FOR THE DELIVERY OF MEDIA CONTENT

CROSS-REFERENCE TO RELATED APPLICATIONS

This application is a continuation of U.S. patent application Ser. No. 10/313,489, filed on Dec. 6, 2002. U.S. patent application Ser. No. 10/313,489 is incorporated herein by reference.

FIELD OF THE INVENTION

This invention relates generally to data transmission and, more particularly, relates to rule-based delivery of media content in a Multimedia Messaging Service.

BACKGROUND OF THE INVENTION

In mobile communications networks, the term Multimedia Messaging Service (MMS) is commonly used to describe a new approach for transmitting messages having multimedia content, where MMS allows messaging between different mobile users and/or between mobile users and the Internet (such as using email or according to the wireless application protocol (WAP)). To the end user, MMS is very similar to the Short Messaging Service (SMS) in that it provides automatic and immediate delivery of user-created content. In addition to the content type used for SMS text, however, MMS messages can contain other types of content, such as graphic images, voice or audio clips, synthetic audio, video clips, and/or presentation information.

The features of MMS have been described by standards developed in the WAP forum and the 3rd Generation Partnership Project (3GPP), both which describe implementation of MMS in similar manners. In the WAP system, MMS is defined in the standard specifications WAP-206-MMSMessagingService and WAP-209-MMSEncapsulation. In the 3GPP system, the solution for providing an MMS in 3rd Generation mobile communication networks and its features are described in 3GPP Technical Specification (TS) 23.140, V.5.4.0 "Multimedia Messaging Service (MMS), Functional Description, Stage 2 (Release 5, 2002-09)."

Typically, multimedia messages are constructed in such a way that the media content, information necessary to describe the media content and addressing information, identifying the intended receiver of the message, are encapsulated together. The multimedia message is then sent from a sending MMS user agent to a Multimedia Messaging Service Center (MMSC), which in turn notifies the intended receiver (recipient MMS user agent) about the message. Later on, the media content within the multimedia message is delivered to, or otherwise downloaded by, the recipient MMS user agent, which can thereafter store and/or view the delivered media content.

Whereas conventional techniques for delivering media content are adequate, such techniques have a drawback in that they are limited in the amount of available control over the delivery of the media content. According to conventional delivery techniques, control over the delivery of the media content is typically limited to the recipient's device capabilities for receiving media content, the recipient's subscription details, and the recipient's preferences with respect to unwanted senders of media content. For example, delivery of media content can be limited in that media content including video objects is not typically delivered to recipients who do not have the capability to view such objects. Also, for example, delivery of media content can be limited to those recipients who subscribe to a service that permits delivery of multimedia content, as such may require a more costly premium-type of service. Further, recipients can typically limit delivery of media content by preventing receipt of media content from specified sending entities.

These limited number of techniques available for controlling the delivery of media content, however, do not suffice to provide for increased customization and optimization of content delivery, and creation of advanced services over MMS. In this regard, only a portion of the aforementioned techniques allow recipients very limited control over the type or size of delivered content, and none of the aforementioned techniques allow recipients to choose the network of which the content is delivered. Similarly, none of the aforementioned techniques allow a sending entity much, if any, control over delivery of the media content. In addition, there aren't any hooks to tailor content delivery according to state of the network such as congestion. Further, even among the conventional techniques, it would be advantageous to have even more robust forms of control, especially for multimedia messages that may take a while to download and which senders and/or recipients might therefore want to be careful about transmitting and/or receiving, respectively, if the only available channel is an expensive one.

SUMMARY OF THE INVENTION

In light of the foregoing background, embodiments of the present invention provide an improved system, method and computer program product for the delivery of media content from a sending entity to at least one recipient. The system, method and computer program product of embodiments of the present invention allow senders and recipients, as well as network operators and other entities, greater control over the delivery of media content by allowing such entities to define rules to which delivery of the media content is subject. In this regard, embodiments of the present invention allow rules to be defined so as to facilitate increased customization and optimization of content delivery, and creation of advanced services over MMS Embodiments also facilitate efficient delivery of media content such as, for example, by specifying that the media content be delivered based upon traffic on the network over which the media content is to be delivered. Further, embodiments of the present invention facilitate inexpensive delivery of media content such as, for example, by specifying that media content be delivered via a network that can deliver the media content in a less expensive manner, as compared to other networks.

According to one aspect of the present invention, a system is provided for delivering media content. The system includes at least one recipient and a sending entity capable of transmitting multimedia message addressed to the recipients. In this regard, the multimedia message includes media content. The system further includes a network entity for receiving the multimedia message. The network entity is capable of identifying at least one rule comprising at least one of a recipient rule and a network rule. As the names suggest, a recipient rule is established by at least one recipient independent of a sending entity. Similarly, the network rule is established by the network entity. With the recipient and/or network rules and the multimedia message, the network entity can deliver the media content to the recipients based upon respective rules. The network entity can also be capable of processing the media content based upon the rules before delivering the media content. For example, the network entity can process the media content by transcoding at least a portion of the media content, and thereafter delivering the transcoded portion of the media content. Also, for example, the network entity can process the media content by truncating at least a portion of the media content. In such instances, the network entity is capable of delivering the truncated portion of the media content.

The recipients can establish any of a number of different recipient rules that can thereafter be utilized by the network entity in delivering the media content. For example, at least one recipient rule can be based upon the connectivity of at least one recipient. In such instances, the network entity can deliver the media content to the recipients based upon the connectivity of the respective recipients. In this regard, in such instances the respective recipient rules can include state information comprising, for example, the connectivity of the respective recipient, where the state information can be updated when the connectivity of the respective recipients changes. Thus, the network entity can determine the connectivity of the respective recipients based upon the state information. Also, for example, at least one recipient rule can be based upon at least one preference of at least one recipient. As such, the network entity can deliver the media content to the recipients based upon the preferences of the respective recipients.

In one embodiment, the multimedia message includes at least one sending entity rule along with the media content, where the sending entity rules can be encoded within the multimedia message. In this embodiment, the network entity can deliver the media content to the recipients based upon the sending entity rules, such as by identifying the sending entity rules from the multimedia message and thereafter delivering the media content. In this regard, the sending entity can transmit any of a number of sending entity rules along with the media content. For example, at least one sending entity rule can comprise a deadline for the delivery of the media content. In such instances, the network entity can deliver the media content based upon the deadlines for delivery of the media content. Also, for example, in one embodiment the media content includes a plurality of objects. In such embodiments, at least one sending entity rule can include an ordering of the plurality of objects of the media content. The network entity can then be capable of delivering at least a portion of the media content based upon the ordering of the plurality of objects of the media content.

Like the recipient rules and the sending entity rules, the network entity can establish any of a number of different network rules. For example, at least one network rule can be based upon traffic on at least one network over which the media content is delivered. In such instances, the network entity can deliver the media content to the recipients based upon the traffic on the respective networks over which the media content is delivered. In this regard, in such instances the respective network rules can include state information comprising the traffic on the respective networks, where the state information can be updated when the traffic on the respective networks changes. Thus, the network entity can determine the traffic of the respective networks based upon the state information.

Also, for example, at least one network rule can be based upon the media content and at least one network over which the media content is delivered. As such, the network entity can deliver the media content to the recipients based upon the media content and the respective networks. For example, a 2 G operator may define a network rule that restricts the size of delivered messages in order to avoid large amount of traffic for MMS messages. Further, for example, at least one network rule can be based upon at least one delivery time of the media content determined based upon the media content and at least one network over which the media content is delivered. The network entity can then deliver the media content to the recipients based upon the delivery times. As a further example, at least one network rule can be based upon bandwidth available to at least one recipient. When a network rule is based upon the available bandwidth, the network entity can deliver the media content to the recipients based upon the bandwidth available to the recipients, the media content and the respective networks over which the media content is delivered.

In one embodiment, the system further includes a storing location coupled to the network entity. In this embodiment, the storing location is capable of receiving at least one recipient rule from at least one recipient. In turn, the network entity is capable of receiving at least one recipient rule from the storing location. In another embodiment, the sending entity can comprise a session initiation protocol (SIP) client, and can transmit a multimedia message addressed to at least one recipient comprising an SIP client. Also in this embodiment, the network entity comprises an SIP proxy server. As such, the network entity can receive at least one recipient rule from at least one recipient, such as according to the SIP REGISTER, PUBLISH and/or SUBSCRIBE techniques, and can forward it to the storing location.

Embodiments of the present invention also provide an improved method and computer program product for the delivery of media content. Therefore, embodiments of the present invention provide an improved system, method and computer program product for the delivery of media content from a sending entity to at least one recipient. The system, method and computer program product of embodiments of the present invention provide greater control over the delivery of media content, as compared to conventional delivery techniques. In this regard, embodiments of the present invention allow senders, recipients, network operators and other such entities to define rules to which delivery of the media content is subject. In this regard, embodiments of the present invention allow rules to be defined so as to facilitate fast, efficient and inexpensive delivery of media content. As such, the system, method and computer program product of embodiments of the present invention solve the problems identified by prior techniques and provide additional advantages.

BRIEF DESCRIPTION OF THE DRAWINGS

Figure 1:
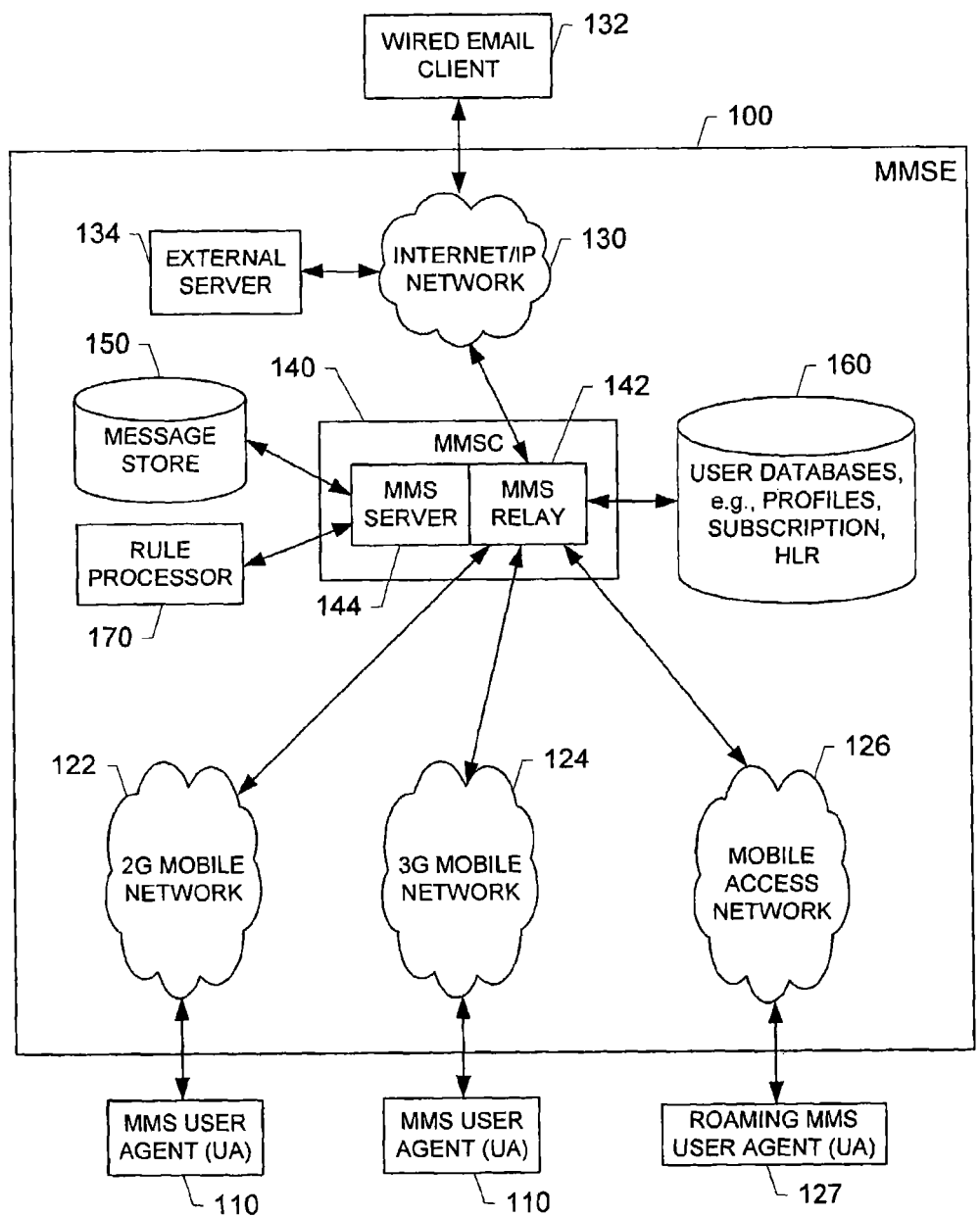
Figure 2:
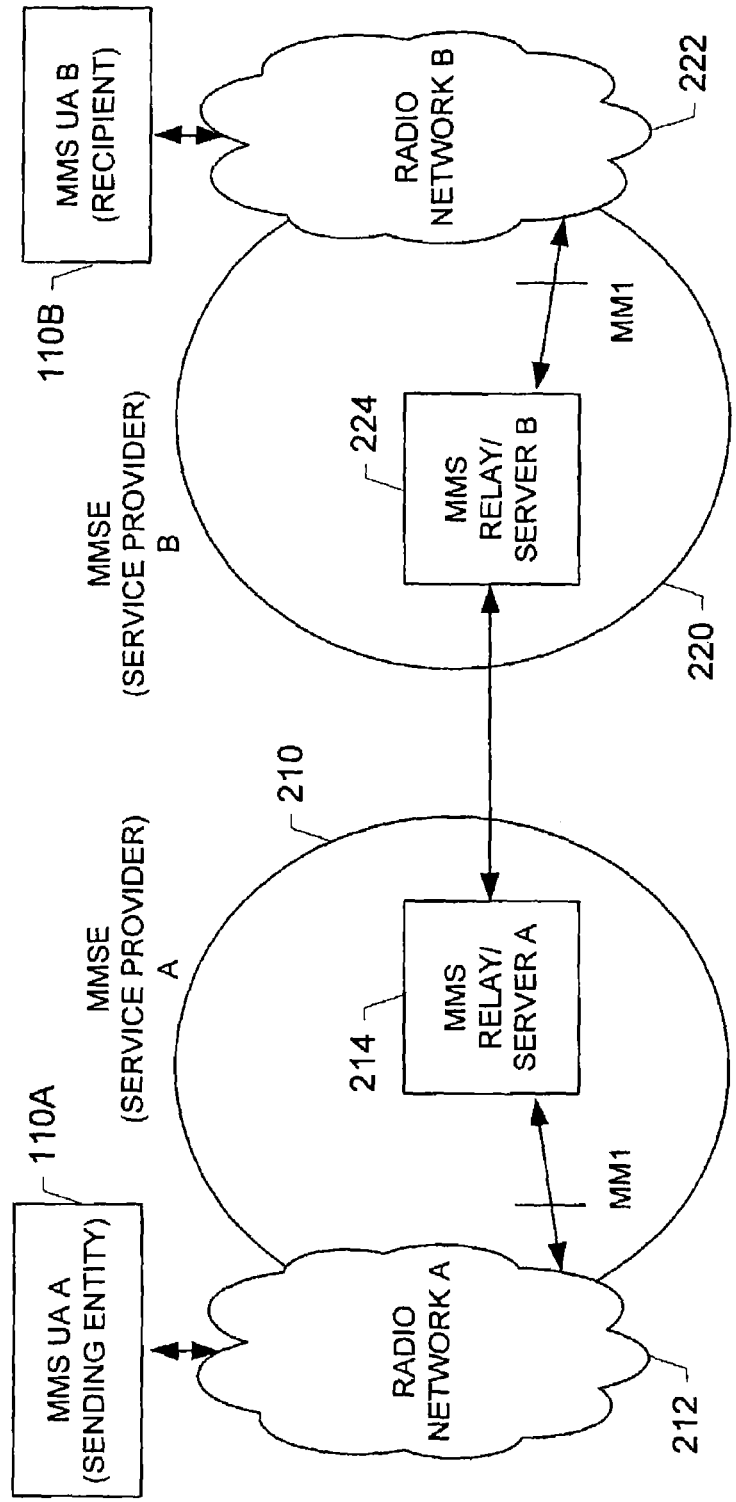
Figure 3:
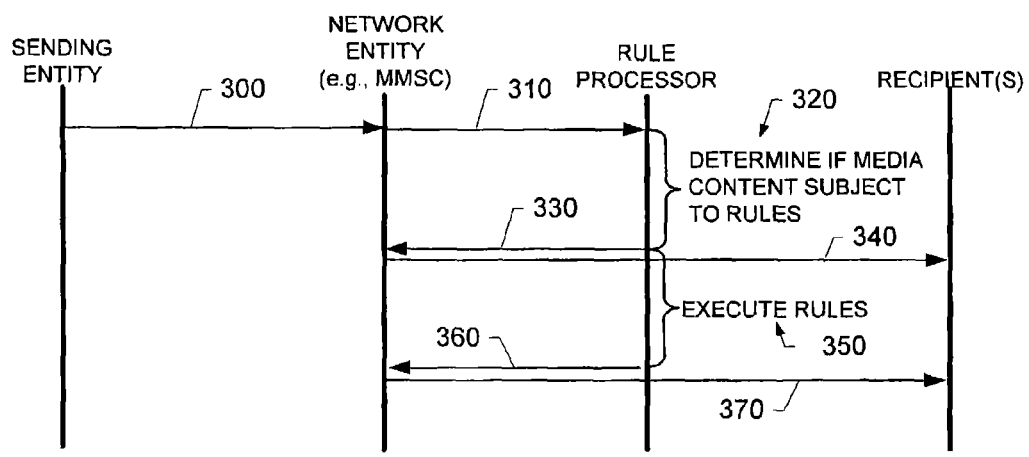
Figure 4:
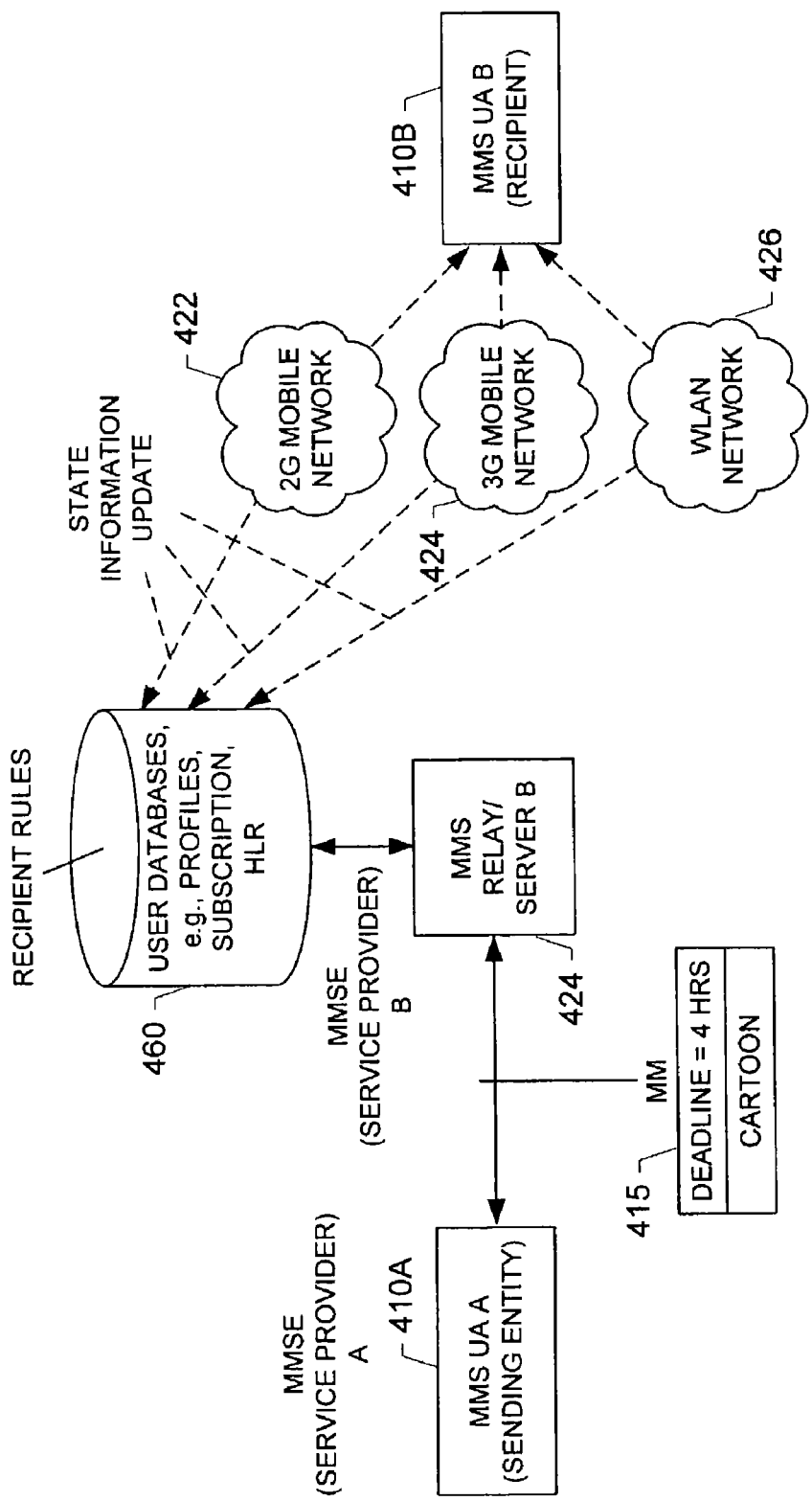
Figure 5:
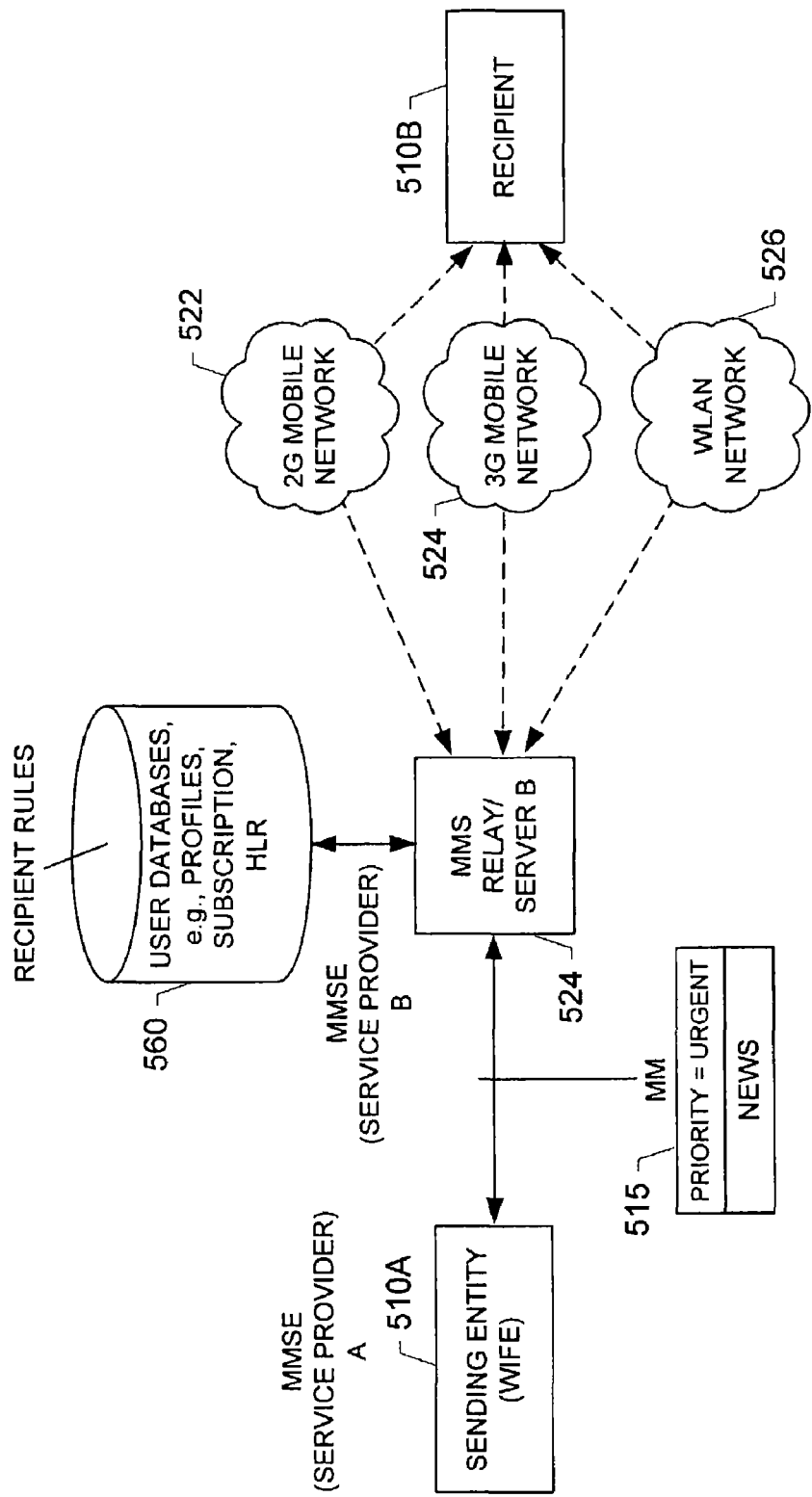

Having thus described the invention in general terms, reference will now be made to the accompanying drawings, which are not necessarily drawn to scale, and wherein:

FIG. 1 illustrates an overview of an MMS system that would benefit from embodiments of the present invention;

FIG. 2 illustrates an overview of the operation of the MMS system according to one embodiment of the present invention;

FIG. 3 illustrates the flow of messages between a receiving MMS relay/MMS server and a recipient MMS user agent in operation of the MMS system according to one embodiment of the present invention;

FIG. 4 illustrates an example of sending entity rules and recipient rules being applied to multimedia message delivery, according to one embodiment of the present invention; and FIG. 5 illustrates another example of sending entity rules and recipient rules being applied to multimedia message delivery, according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Reference is now drawn to FIG. 1, which illustrates an overview of MMS system elements according to one embodiment of the present invention. The system comprises a plurality of MMS user agents (UAs) 110, each of which is capable of transmitting and receiving multimedia messages. The system also includes a roaming MMS user agent 127, and access networks 122, 124 and 126. The access networks are generally of different types and can include, for example, a second generation (2G) mobile telecommunications network 122, such as a GSM phase 2 network, a third generation (3G) mobile telecommunications network 124, such as a Universal Mobile Telecommunications System (UMTS), and a mobile access network 126, such as a wireless local area network (WLAN).

The system can also include a wide area network (WAN) 130, such as the Internet (or another Internet Protocol (IP) network), having an external server 134, such as an e-mail server, and a wired E-mail client 132. Additionally, the system includes a Multimedia Messaging Service relay 142 and an MMS server 144 which, in this example, are integrated into a single unit, referred to as a Multimedia Messaging Service Center (MMSC) 140. In one embodiment, the MMSC can comprise a session initiation protocol (SIP) proxy server configured in compliance with the specification RFC 3261 of the Internet Engineering Task Force (IETF), entitled: "SIP: Session Initiation Protocol," with an MMS server and MMS relay collocated. In such embodiments, the MMS user agents (UAs) 110 can comprise SIP clients. It should be understood, however, that the Multimedia Messaging Service relay and the MMS server can alternatively be implemented as separate or distributed entities. The system also includes a message store 150 in connection with the MMS server, and one or more user databases 160, such as are typically associated with a profile server, home location register (HLR), billing server or the like. In this regard, the user databases can comprise, for example, user profile information, as well as user subscription and addressing information. The user databases can also store the recipient and network rules, and state information to be used with those rules, as described below.

The system further includes a rule processor 170 capable of executing rules that define how the system delivers media content, as described below. The rule processor can comprise any of a number of different processing devices such as, for example, a personal computer, a server computer or other high level processor. The rule processor is shown and described below as comprising an element distinct from the MMSC 140, however, it should be understood that the rule processor can be embodied in the MMSC without departing from the spirit and scope of the present invention. Alternatively, it will be appreciated that the functions performed by the rule processor, as described below, can be performed by the MMS server 144, or any other processor integrated within, or electrically coupled to, the MMSC.

The collective term Multimedia Messaging Service Environment (MMSE) is used to describe those functional elements that operate together to implement a multimedia messaging service. In FIG. 1, an MMSE is formed by the elements within the outlined region 100. In this regard, each MMS user agent 110 can connect to the MMS relay 142 through one or more networks 122, 124. The roaming MMS user agent 127 can connect to the MMS relay 142 through the mobile access network 126 and/or via the Internet 130. The MMS relay is connected to the MMS server 144 and to the user databases 160. Furthermore, the external server 134 and the wired Email client 132 are connected to the Internet 130.

FIG. 2 shows an overview of interworking between different MMSE's according to one embodiment of the present invention. As shown, the communication of multimedia messages takes place between user agents 110A (sending entity) and 110B (recipient), which reside in two different MMSE's. For simplicity and clarity, the two MMSE's, MMSE A 210 and MMSE B 220, are each shown to comprise a single MMS relay, linked to a single MMS server, thus forming two MMSC's 214 and 224, respectively. It should be understood, however, that in a practical MMSE, the number of MMS relays and servers may be, and typically will be, greater than that illustrated. MMSE A and MMSE B may, for example, have different operators, different geographical locations or coverage areas and/or differ in terms of their technical characteristics and capabilities. Furthermore, in the situation where a particular MMSE comprises more than one MMS relay, the method according to the invention can also be applied within the single MMSE.

In the example shown in FIG. 2, both MMS user agents 110A and 110B are depicted as devices that communicate with their respective MMSE 210, 220 via a radio communication network 212, 222. However, it should be understood that either MMSE user agent A or MMSE user agent B, or both of them, could communicate with respective MMSE's via one or more additional or alternative networks, including via a fixed line network (not shown). It will be assumed that MMS user agent A 110A, which has subscribed to the multimedia messaging service provided in MMSE A 210, wishes to send some media content to MMS user agent B 110B, which has a subscription to the multimedia messaging service provided in MMSE B 220. In general, the content of a multimedia message can comprise one or more objects, such as text, graphical, audio and/or video content.

When initiating the communication of a multimedia message to MMS user agent B 110B, MMS user agent A 110A first selects the media content to be transmitted. For example, the media content may take the form of a still image and some associated text, stored in the memory of user agent A. The image may have been recorded, for example, using a camera, and still image encoding equipment built into user agent A. Alternatively, the image and text may already have been downloaded from another source to user agent A. In either case, user agent A typically encapsulates the media content as a multimedia message, comprising the media content itself, information necessary to describe the media content and addressing information, identifying the intended recipient of the message. MMS user agent A then sends the message to MMS relay A 214 through radio network A 212.

On receiving the multimedia message, MMS relay A 214 determines, from the addressing information included with the message, that the intended recipient is not a user agent of MMSE A 110A, but a user agent of MMS relay B 224, and forwards the multimedia message to MMS relay B. Routing of the multimedia message to the correct MMS relay, i.e. that responsible for MMS user agent B 110B, is achieved, for example, using standardized mechanisms provided for in the existing 3GPP multimedia messaging solution. In conventional operation, on receiving the multimedia message, MMS relay B delivers the media content in MMS server B to the intended recipient, MMS user agent B. Alternatively, the MMS relay B can store the media content in MMS server B and send a notification to MMS user agent B thereby indicating that a multimedia message has arrived and its content is available to be downloaded from MMS relay B. In response to receiving the notification, MMS user agent B retrieves the media content from (via) the MMS relay B. The retrieval of the media content is initiated by signaling with MMS relay B.

To allow the recipients of multimedia messages greater flexibility in receiving the multimedia messages, embodiments of the present invention provide recipient rules that can define how the multimedia messages are delivered. As described below, the recipient rules are typically defined by recipients (e.g., user agent B 110B) of multimedia messages independent of a sending entity, and are executed in the rule processor 170. In this regard, to allow the sending entities (e.g., user agent A 110A) of the multimedia messages greater flexibility in how the multimedia messages are delivered, embodiments of the present invention also provide sending entity rules that can define how the multimedia messages are delivered, and are typically executed in the rule processor. Further, embodiments of the present invention can also provide network rules that allow network operators or other entities, to define how the multimedia messages are delivered over the associated networks. In this regard, the multimedia messages can be delivered according to more universal rules, such as rules that apply to all multimedia messages addressed to a particular recipient, or all multimedia messages of a certain type regardless of the sender or recipient.

Whereas the following description will separately include a discussion of each of the three types of rules defining delivery of the multimedia messages, it should be understood that the system can deliver the multimedia messages based on one or more of the different types of rules. For example, the system can deliver multimedia messages based upon both recipient rules and sending entity rules. Alternatively, the system can deliver multimedia messages based upon all three of recipient rules, sending entity rules and network rules. It will also be understood that the rules upon which multimedia messages are delivered can be defined on a message-by-message basis such that each multimedia message can be delivered based upon different rules selected from one or more of the different types of rules (i.e., recipient rules, sending entity rules and network rules).

As stated above, embodiments of the present invention provide recipient rules that can define how the multimedia messages are delivered. The recipient rules are typically specified by the recipients (e.g., user agent B 110B) of multimedia messages. The recipient rules can comprise any of a number of different rules that define how the recipients receive multimedia messages. It will be appreciated by those skilled in the art that various networks can transmit information at various transfer rates and require various amounts of bandwidth to transfer information. Further, it will be appreciated that cost to the system operator and, thus, the end users, can vary depending upon the network over which information is transmitted. Therefore, the recipient rules can include, for example, rules based upon the connectivity of respective recipients. For example, one or more recipients can define a recipient rule that only permits delivery of multimedia messages when the respective recipients are connected to one of a limited number of networks, such as a 2G mobile network 122, 3G mobile network 124, a mobile access network 126 (e.g., a WLAN) and/or a WAN 130 (e.g., Internet). In such instances, the recipient rules may require the MMSC 140 and/or the rule processor 170 to check the connectivity of the recipient, or may require the recipient to report or otherwise indicate to the MMSC and/or rule processor the connectivity of the recipient. As such, the recipient rules can include not only the networks over which the media content may be delivered, but can also include state information regarding the network to which the recipient is currently connected.

In addition to, or in lieu of, defining recipient rules based upon the connectivity, one or more recipient rules can be defined based upon recipient preferences. For example, a recipient can define a recipient rule that only permits delivery of multimedia messages from specified sending entities, identified either on an individual basis or collectively. Also, for example, a recipient can define a recipient rule that only permits delivery of specified types of multimedia messages, such as messages containing graphic, audio and/or video content. In addition, the recipient can define a recipient rule that only permits delivery of specific portions of multimedia messages, such as text portions of multimedia messages that also contain, for example, graphic, audio and/or video content.

Further, one or more recipient rules can be defined such that the media content is transcoded, truncated or otherwise processed prior to being delivered to the recipient. For example, the rule processor can transcode the media content whereby the media content is reformatted so that the content can be viewed by the recipient (e.g., MMS user agent B 110B). By transcoding, or reformatting, the media content, the size of the media content can typically be reduced to thereby facilitate fast and efficient delivery of the media content. In other instances, if so specified the rule processor can truncate the media content, such as by removing various objects of the media content, such as by removing less preferred objects (as such may be designated by the particular rule) or removing larger objects. For example, media content including text and video content can be truncated by removing the video content. In such instances, the truncated portion of the media content can then be delivered to the recipient.

In embodiments in which the recipient defines the recipient rules and thereafter transmits the recipient rules to the rule processor 170 or other network entity as described below, the recipients can format the recipient rules such that the recipient rules can subsequently be interpreted and executed. In this regard, the recipient rules can be formatted in any of a number of different formats. For example, in one embodiment, the recipient rules are formatted in an Extensible Markup Language (XML)-based format, such as in the Call Processing Language (CPL) or a similar language, as is known to those skilled in the art. Upon formatting the recipient rules, the recipient rules can be associated with respective recipients and stored for subsequent interpretation and execution.

The recipient rules can be associated with respective recipients in any of a number of different manners, such as by associating the recipient rules with the addressing information (i.e., telephone number) for the respective recipients, as such is known to those skilled in the art. Thereafter, the recipient rules can be stored in any of a number of different storing locations, which are typically coupled to the rule processor 170, which is typically the network entity executing the recipient rules. For example, the recipient rules can be stored in the message store 150 or other memory associated with the MMSC. Alternatively, the recipient rules can be stored in one or more user databases 160, such as an HLR. In one typical embodiment, the recipient rules are stored in a profile database associated with a profile server.

To store the recipient rules, then, the respective recipient rules can be uploaded or otherwise transferred to the respective databases for storage. For example, the recipients can transmit the recipient rules to the profile server, which thereafter stores the recipient rules in the database associated with the profile server. Alternatively, for example, the recipient rules can be transmitted directly to the MMSC 140. In such embodiments, the recipient rules can be transmitted, for example, upon registration with the network operator that operates the respective MMSC. Upon storing the recipient rules, the profile server can transmit a confirmation back to the recipients to indicate that the recipient rules have been successfully stored. The recipient rules, as well as the confirmation, can be transmitted in any of a number of different manners such as, for example, according to the Short Messaging Service (SMS), as such is known to those skilled in the art. In embodiments where the MMSC comprises a SIP proxy server, the recipient rules can be transmitted any of a number of different known techniques, including the SIP REGISTER, PUBLISH, or SUBSCRIBE technique (as such are defined in RFC 3261 and RFC 3265 of the IETF).

By storing the recipient rules with respect to the rule processor 170, the recipient rules can be accessed by the rule processor so that the rule processor can execute the recipient rules and cause the MMSC 140 to deliver the media content to the recipients based upon the recipient rules. In addition, by storing the recipient rules for subsequent access by the rule processor 170, the recipient rules can easily be updated or otherwise altered by replacing the recipient rules with updated or otherwise altered recipient rules. The updated recipient rules can replace the already stored recipient rules in a number of different manners, such as by only storing one set of recipient rules associated with each recipient. As such, the updated recipient rules can be associated with the respective recipient and thereafter stored in a manner similar to the previously stored recipient rules, thereby replacing the previous stored recipient rules. In an alternative embodiment, the updated rules can supplement previously stored recipient rules, generally not replacing the previously stored recipient rules unless the updated rules are contrary to the previously stored recipient rules. In instances in which the updated rules are contrary to the previously stored rules, then, the updated rules can be stored in such a manner so as to replace the contrary rules.

As indicated above, recipient rules can include, for example, rules based upon the connectivity of respective recipients and, as such, include state information including the network to which the recipient is currently connected. In such instances, delivery of the media content can depend upon the current state of the recipient, as indicated by the state information. For example, a recipient rule may specify that the MMSC 140 and/or rule processor 170 first check the connection of the recipient, as such may be indicated in the state information. For example, the state information may indicate whether the recipient is connected to a low bandwidth network (e.g., 2G network) or a high bandwidth network (e.g., WLAN network). The recipient rules may then specify delivery of the media content based upon the connectivity. As such, when the recipient rules involve checking the connection of the recipient, the recipient can set, change or otherwise update the state information in the recipient rule when the connectivity of the recipient changes. For example, after moving from a 2G network to a WLAN network, the recipient can update the connectivity as indicated by the state information in the recipient rule. The recipient can update the recipient rules such as by sending a message to the entity (e.g., profile server and/or MMSC) that stores recipient rules, or some other entity that can make the state information available to rule processor. Also, the recipient rules can be changed with updated state information in response to change in the connection of the recipient, or the recipient rules can be checked and/or changed periodically.

In addition to, or in lieu of, delivering the media content based upon the recipient rules, the MMSC 140 can deliver the media content based upon one or more sending entity rules. The sending entity rules are typically specified by the sending entities (e.g., user agent A 110A) of multimedia messages. The sending entity rules can comprise any of a number of different rules that define how the media content is delivered. As described above, various networks can transmit information at various transfer rates and require various amounts of bandwidth to transfer information, and can have different associated costs to the end users. As such, like the recipient rules, the sending entity rules can comprise, for example, rules based upon the connectivity of the respective recipients (e.g., user agent B 110B) and/or rules specifying that the media content be processed, such as by being transcoded and/or truncated. By specifying one or more sending entity rules based upon the connectivity of the respective recipients, and/or by specifying one or more sending entity rules such that the media content is transcoded and/or truncated, the sending entity can send media content to the respective recipients in a more cost efficient manner, such as by specifying that the media content be delivered over a lower cost network and/or by specifying that content requiring higher bandwidth (e.g., video content) be truncated from delivered MMS messages when such messages are delivered over higher cost networks. In this regard, by specifying one or more sending entity rules as such, the end users can receive a substantial cost benefit, particularly in instances in which the media content includes objects (e.g., video and/or audio content) that take up more bandwidth when compared to other types of messages, such as SMS messages.

In addition to, or in lieu of, defining sending entity rules based upon the connectivity, and defining sending entity rules to thereby transcode and/or truncate the media content, one or more sending entity rules can be defined based upon a delivery deadline. For example, a sending entity can specify that the media content be delivered to one or more recipients within a predefined period of time. And if the media content is not delivered by the predefined period of time, delivery of the media content can then be cancelled, with the sending entity receiving notification that the media content was non-deliverable within the predefined period of time.

Further, for example, a sending entity rule can be defined that orders the objects within the media content, such as ordering the graphic, audio and/or video content of the media content. For example, the sending entity can define a sending entity rule that specifies the following order: (1) text content, (2) graphic content, (3) audio content and (4) video content. By ordering the objects within the media content, the sending entity can specify which objects the sending entity prefers to be delivered in instances in which only a portion of the media content is delivered to the recipients, as described below. Therefore, the sending entity can maintain expressiveness of content to the extent possible, even when the media content is transcoded or truncated before delivery. For example, if the media content included a sports video clip with audio commentary, the sending entity could order video at a higher priority than the audio. In this regard, the sending entity can preserve the expressiveness of the message, which is embodied in the video clip. Further, if the video clip is comprised of frames including images of players in a sporting event superimposed on background images (e.g., audience, field, sky etc.), the images of the players can be ranked at a higher priority that the background images. On the other hand, if the media content included a song clip with an audio track and a video of the singer, the sending entity may order the audio a higher priority than the video.

In one typical embodiment, the sending entity can specify sending entity rules on a message-by-message basis, with or without storing the sending entity rules. For example, an MMS client within the sending entity that enables the sending entity to construct and send multimedia messages can provide a user interface for constructing sending entity rules on a message-by-message basis. In yet another typical embodiment where the sending entity generates and transmits mass multimedia messages (e.g., a news server), the MMS client used to construct the messages may have provisions to define sender rules.

The sending entity rules are typically passed to the rule processor 170 prior to delivery of the media content by the MMSC 140. In one advantageous embodiment, for example, the multimedia message transmitted by the sending entity includes the sending entity rules along with the media content and other information (e.g., addressing information). In this regard, the sending entity rules can be encoded in a separate header of the multimedia message. Alternatively, the sending entity rules can be integrated into the multimedia message, such as according to the Synchronous Multimedia Integration Language (SMIL), which can standardize tags to encode the sending entity rules. Thus, the sending entity rules can be transmitted to the MMSC each time media content is transmitted to the MMSC for delivery to one or more recipients. Upon receipt of the multimedia message, then, the MMSC can pass the multimedia message to the rule processor, which can determine if the multimedia message includes any sending entity rules and thereafter execute the sending entity rules and cause the MMSC to deliver the media content to the recipients based upon the sending entity rules. In addition, by transmitting the sending entity rules with each multimedia message, the sending entity rules can be updated or otherwise altered at the sending entity, with the updated or otherwise altered sending entity rules thereafter transmitted to the MMSC with subsequent multimedia messages. Further, transmitting the sending entity rules with each multimedia message enables the sending entity to define rules that are specific to each message, and/or each type of message. For example, the message deadline of an emergency message can be set to very low value, while that of an entertainment cartoon clip can be set to a high value.

In addition to, or in lieu of, the recipient rules and/or the sending entity rules, the media content can be delivered to recipients (e.g., user agent B 110B) based upon one or more network rules. The network rules can be specified by the sending entities (e.g., user agent A 110A) and/or the recipients. In this regard, the network rules can be included within the sending entity rules and/or the recipient rules. The network rules can additionally, or alternatively, be specified such as by a system operator or other entity. As previously indicated, various networks can transmit information at various transfer rates and require various amounts of bandwidth to transfer information, and can have different associated costs to the end users. Further, it will be appreciated that the time required to deliver the media content, as well as the efficiency with which the media content is delivered, can vary based upon an amount of traffic on the respective networks. That is to say, as more information is simultaneously transmitted over the respective networks (i.e., the more the network traffic), longer it can take to transmit the information, with the information being transmitted less efficiently. Therefore, the network rules can comprise any of a number of different rules that define how the media content is delivered to the recipients so as to deliver the media content in a quicker and more efficient manner. As such, network operators can utilize network rules for load balancing, among other purposes.

For example, a network rule can be defined that requires media content with specific object types to be delivered over one of a limited number of networks, such as a 2G mobile network 122, 3G mobile network 124, a mobile access network 126 (e.g., a WLAN) and/or a WAN 130 (e.g., Internet). In addition, or in the alternative, a network rule can be defined based upon an amount of traffic on the network over which the media content is to be delivered. For example, the network rule can specify an order of preference of network types over which to deliver the media content. The network rule can further specify that, should a more preferred network type have network traffic above a threshold, the media content will be delivered via the next lowest preferred network that has network traffic below the threshold. Alternatively, the network rule can be defined without an order of preference of network types. In such instances, the network rule can specify that the MMSC 140 deliver the media content when the traffic on the network over which the media content is to be delivered is below the threshold, or if the traffic is above the threshold, hold (e.g., store) the media content until the traffic on the network drops below the threshold. Also, for example, a network rule can, be defined that specifies delivery of the media content based upon the objects that comprise the media content and the network over which the media content is to be delivered. In such instances, the network rule can be based upon an amount of time required to deliver the media content via the network over which the media content is to be delivered. The amount of time required to deliver the media content, in turn, can be based on a number of different factors in addition to the media content and the network. For example, the amount of time can be based upon the traffic on the network.

Irrespective of how the amount of time is determined, the network rule in such instances, like before, can specify that, should the network over which the media content is to be delivered require an amount of time above a threshold, the rule processor 170 can truncate, transcode or otherwise reduce the size of the media content such that the amount of time required to deliver the media content to the recipients is below the threshold. Alternatively, in instances in which the network over which the media content is to be delivered has the capability to deliver the media content within the threshold time, the network rule can be met without reducing the size of the media content. In such instances, the network rule can specify that the MMSC 140 deliver the entire media content when the amount of time required to deliver the media content is below the threshold, or if the amount of time is above the threshold, hold (e.g., store) the media content until the amount of time drops below the threshold, such as when traffic on the network decreases.

A network rule can also be defined based upon available bandwidth to the respective recipients within the respective networks over which the media content is to be delivered. In this regard, when a number of user agents are connected to the respective networks, an amount of bandwidth is allocated to each user agent. Thus, the network rule can specify that the MMSC 140 deliver the media content when the bandwidth available to the respective recipients is above a threshold. If the available bandwidth to the respective recipients is below the threshold, then, the network rule can specify that the MMSC hold (e.g., store) the media content until the amount of time drops below the threshold, such as when traffic on the network decreases. In this instance, the recipient can be advised upon the eventual delivery of the message that the message could have been delivered sooner if additional bandwidth had been available, and the recipient may be presented with the opportunity to upgrade its service to obtain additional bandwidth.

In instances in which the network rules are based directly or indirectly on network traffic or bandwidth available to the respective recipients, the network rules may require the MMSC 140 and/or the rule processor 170 to check the state of one or more of the networks, such as traffic on the networks and/or bandwidth available on the networks. As such, the network rules can include state information regarding traffic on the respective networks and/or bandwidth available on the networks.

Like with the recipient rules and the sending entity rules, the network rules can be formatted such that the network rules can subsequently be interpreted and executed. In this regard, the network rules can be formatted in any of a number of different formats, such as in XML. Also like with the recipient rules and the sending entity rules, the network rules can be stored for subsequent interpretation and execution. The network rules can be stored in any of a number of different locations and, in embodiments where the network rules are defined by the recipients and/or the sending entities, the network rules are typically stored in a manner similar to the recipient rules and/or the sending entity rules, respectively. In embodiments where the network rules are not defined by the recipients or the sending entities, however, the network rules are typically stored with respect to the rule processor 170, such as in a manner similar to the recipient rules. In such instances, the network rules can be associated with respective network types (e.g., 2G network 122, 3G network 124, etc.) over which the media content is to be delivered.

The network rules can also be updated or otherwise altered in a manner similar to the recipient rules, such as by storing only one set of network rules for each network type. Also as indicated above, network rules can include, for example, rules based upon the traffic on respective networks and/or bandwidth available to recipients on respective networks and, as such, can include state information including the traffic on respective networks and/or bandwidth available on respective networks. In such instances, delivery of the media content can depend upon the current state of the network over which the media content is to be delivered, as indicated by the state information. For example, a network rule may specify that the MMSC 140 and/or rule processor 170 first check the state of the network over which the media content is to be delivered, as such may be specified by the network rule. The network rules may then specify delivery of the media content based upon traffic on the network. As such, when the network rules involve checking the traffic, or available bandwidth, on the network, the network rules can be set, changed or otherwise updated when the traffic, or available bandwidth, on the network changes. The network rules can be updated, such as by any of a number of known network entities capable of monitoring traffic, or available bandwidth, on the network. Such entities can update the network rules, then, such as by sending a message to the entity (e.g., profile server and/or MMSC) that stores network rules, or some other entity that can make the state information available to rule processor. Also, the network rules can be changed with updated state information in response to a change in the traffic, or available bandwidth, on the network, or the network rules can be checked and/or changed periodically.

Although a number of recipient rules, sending entity rules and network rules have been described above, it will be appreciated that the rules described are merely representative of the recipient rules, sending entity rules and network rules capable of being defined and thereafter executed according to the present invention. In this regard, any of a number of different rules can be specified by the sending entities (e.g., user agent A 110A), the recipients (e.g., user agent B 110B) and/or other capable entities (e.g., a system operator). Thus, the foregoing description of the specific rules is provided only as an example of the many different rules that can define delivery of the media content and, therefore, should not be construed to limit the present invention.

As described above, the recipient rules, sending entity rules, and the network rules can be based upon a state of the recipient and/or the operating conditions of the various networks over which the media content can be delivered to the recipient. In this regard, the state of the recipient and/or the operating conditions of the various networks can be determined to thereby determine the applicability of the network rules. The state of the recipient and the operating conditions can be determined in any one of a number of different manners by network entities conventionally capable of determining such states and conditions. In this regard, the state of the recipient and the operating conditions can be determined and thereafter transmitted to the rule processor 170, which typically executes the respective rules. In one embodiment, in which the MMSC 140 comprises represents a SIP proxy server, the state of the recipient can be provided by uploading the information using the SIP REGISTER, PUBLISH, or SUBSCRIBE technique (as defined in RFC 3261 and RFC 3265 of the IETF).

It will be appreciated that media content can be delivered based upon any one or more recipient rules, sending entity rules and/or network rules. It will also be appreciated that in some instances one rule may specify delivery of media content in one manner, while another rule specifies delivery of media content in another manner. For example, delivery of media content can be subject to a recipient rule based upon the connectivity of the recipient, and be subject to a network rule based upon traffic on the network over which the media content is delivered. In such instances, the rule processor can execute the rules in a number of different manners. In one advantageous embodiment, however, the rule processor 170 causes the MMS server 144 to deliver the media content when all of the rules to which the media content is subject are satisfied. Extending the example above, then, the rule processor may cause the MMS server to deliver the media content when both rules are met, namely when the recipient rule based on connectivity is met and the network rule based on network traffic is met.

In such instances in which a conflict exists between the recipient rules, sending entity rules and/or the network rules, the rule processor can execute the respective rules in any of a number of different manners. For example, the rule processor can execute the rules in a hierarchical order, such as by executing network rules over conflicting recipient and sending entity rules. Similarly, for example, the rule processor can execute recipient rules over conflicting sending entity rules. In an alternative embodiment, when the rule processor identifies one or more conflicting rules, the rule processor can notify the sending entity of the conflict and the undeliverability of the media content.

Having described a number of different recipient rules, sending entity rules and network rules, delivering media content from a sending entity based upon such rules will now be described. More particularly, for example, FIG. 3 illustrates the flow of a multimedia message and media content that can take place when MMS user agent A 110A (sending entity) desires to send media content addressed to recipient MMS user agent B 110B (recipient), as shown in FIG. 2.

The method of delivering media content begins with the MMS user agent A 110A selecting the media content to be transmitted, where the media content can include a number of objects, such as text, graphic, video and/or audio content. Upon selecting the media content to be transmitted, user agent A encapsulates the media content as a multimedia message, comprising the media content itself, information necessary to describe the media content and addressing information, identifying the intended recipient of the message. In addition, the multimedia message can further include one or more sending entity rules from the sending entity. It will be appreciated, however, that the multimedia message need not include any sending entity rules. It will also be appreciated that the sending entity may be capable of storing, and may have stored, one or more sending entity rules, but generate the multimedia message without any sending entity rules, if so desired.

After forming the multimedia message, MMS user agent A transmits the multimedia message (designated by line 300). More particularly to the example shown in FIG. 2, MMS user agent A sends the message to MMS relay A 214 through radio network A 212. On receiving the multimedia message, MMS relay A determines, from the addressing information included with the message, that the intended recipient is not a user agent of MMSE A 210, but a user agent of MMS relay B 224, and forwards the multimedia message to MMS relay B. Routing of the multimedia message to the correct MMS relay, i.e. that responsible for MMS user agent B, can be achieved, for example, using standardized mechanisms provided for in the existing 3GPP multimedia messaging solution.

Upon receipt of the multimedia message at MMS relay B, the MMS server passes the multimedia message to a rule processor 170 associated with MMS server B (designated by line 310). After the rule processor receives the multimedia message, the rule processor can determine whether delivery of the media content of the multimedia message is subject to any recipient rules, sending entity rules and/or network rules. (designated by 320). Also upon receipt of the multimedia message, the MMS relay B can store the media content, such as in a message store 150 associated with MMS server B. If delivery of the media content is not subject to any such rules, the rule processor can pass the multimedia message back to the MMS server which, in turn, can deliver the media content to the recipient (designated by lines 330 and 340), such as in accordance with conventional techniques. If delivery of the media content is subject to any recipient rules, sending entity rules and/or network rules, the rule processor can execute such rules (designated by 350). After executing the rules, the rule processor can pass the multimedia message back to the MMS server to thereby cause the MMS server to deliver the media content in accordance with the executed rules (designated by lines 360 and 370).

More particularly as to determining and thereafter executing any recipient, sending entity and/or network rules, the rule processor 170 can interpret the multimedia message to determine whether the multimedia message includes any sending entity rules. For example, the rule processor can parse the multimedia message and interpret the content of the multimedia message to identify any sending entity rules. The rule processor can also determine whether the multimedia message is to be delivered based upon any recipient rules, such as by determining whether any stored recipient rules are associated with the recipient of the media content (MMS user agent B 110B), as such may be determined based upon the addressing information identifying the recipient of the media content. Further, the rule processor can determine whether delivery of the media content is subject to any network rules, such as by determining whether any network rules are contained within the multimedia message (if designated by the sending entity), whether any network rules are stored associated with the recipient (if designated by the recipient), and/or whether any network rules are associated with the network over which the recipient is to receive media content (if designated by another entity such as a system operator).

If the media content is subject to any recipient, sending entity or network rules, the rule processor 170 can execute the rules and thereafter pass the multimedia message back to the MMS server (e.g., MMS server B 224) so that the MMS server can thereafter deliver the media content to the recipient based upon the rules. If required by the particular rules, however, the rule processor can process the media content accordingly as the rules are executed and/or before passing the multimedia message back to the MMS server. For example, the rule processor can transcode and/or truncate the media content.

Reference is now made to FIG. 4, which illustrates overview of interworking of various elements in a system according to one exemplary embodiment of the present invention, highlighting a scenario where sending entity rules and recipient rules are applied to delivery of media content. As shown, a sending entity 410A has constructed a sending entity rule specifying a delivery deadline of four hours for a multimedia message (MM) 415, which comprises an entertainment cartoon clip that is not deemed urgent by the sending entity. The multimedia message is then forwarded to MMS Server B 424, which although not shown, can be forwarded via MMS Server A, as indicated in FIG. 2. The deadline is encoded in the multimedia message, such as is described above. The recipient 410B has defined a recipient rule, which is stored in an associated database 460, stating that unless a message deadline is exceeded, attempt to deliver any multimedia messages over WLAN, as long as the respective messages do not exceed a size of 200 KB. Otherwise, deliver the respective multimedia messages over the network to which the recipient is currently connected. The recipient rules can continue by indicating that, if the current network offers low a transmission rate (such as 2G network), do not exceed the message size of 1 KB. If the current network offers a high transmission rate (such as 3G network), however, do not exceed a message size of 50 KB. Further, the recipient rules can include state information including the current network to which the recipient is connected. As highlighted in FIG. 4, then, the recipient can update the recipient rules with different state information, as the network to which the recipient is connected changes. According to the recipient rules, if the recipient connects to a WLAN before the message deadline, the message is delivered over WLAN. If the recipient does not connect to a WLAN before the deadline, however, the message is delivered over the current access network. In either case, if the size of the media content exceeds the limit defined for the specific network, the message can be processed, such as by being transcoded or truncated, or the message can be deemed undeliverable.

In instances where sending entities and/or recipients can specify delivery of media content over less costly networks, network operators may offer certain incentives if media content is delivered over such less costly networks. For example, in a typical MMS charging model where the sender pays for delivery of media content, an amount of credit can be given to the sender if the media content is delivered over WLAN (i.e., a less costly network). By offering such an incentive, the sender may be motivated to impose a sending entity rule specifying a high deadline to non-urgent messages.

In certain services where recipients pay to receive media content, such as from news services, recipients effectively pay for delivery of the media content through a subscription fee typically charged by such services. Typically, the recipients pay the news server based on the volume of messages received by the recipients and, in turn, server (as a sending entity) pays the network operator. In such instances, the recipient may prefer that a high deadline be placed on less important news items (e.g., daily newspaper cartoons), while a low deadline is placed on more important headline news. In this regard, the news server may provide options to recipients to select deadlines for various media content categories (e.g., cartoons, headline news, sports news, advertisements). As such, the news server can thereafter construct sending entity rules to associate proper deadlines with corresponding messages at the time of message transmission.

Turning now to FIG. 5, an overview of interworking of various elements in a system according to another exemplary embodiment of the present invention is shown, highlighting another scenario where sending entity rules and recipient rules are applied to delivery of media content. As before, a sending entity 510A has constructed a multimedia message (MM) 515, which comprises a news clip. The multimedia message is then forwarded to MMS Server B 524, which although not shown, can be forwarded via MMS Server A, as indicated in FIG. 2. In the illustrated example, the recipient 510B has defined recipient rules, which are stored in an associated database 460. In the example illustrated in FIG. 5, consider the following recipient rules written in an XML-based format:

```
<mmspl>
# delivery solely depends on user's state
<state-switch>
    # delivery rule for WLAN - signalled through user
    <state is "WLAN">
        # deliver all message right away
        <deliver url="joe.cool@wlan.provider1.com"/>
    </state>
    # delivery rules for 3G - a bit more complicated
    <state is "3G">
        # delivery depends on sender's address in the first place
        <address-switch field="origin">
            # my wife's phone -> deliver right away
            <address is "+11235552587">
                <deliver phone="+13455553455"/>
            </address>
            # otherwise look at the priority of the message, encoded
            through sender
            <otherwise>
                <priority-switch>
                    # if priority is urgent, send at least the text portion to phone
                    <priority equals="urgent">
                        <deliver phone="+13455553455" content="text"/>
                    </priority>
                    # otherwise deliver message to mailbox
                    <otherwise
                        <deliver url="joe.cool@mailbox.provider2.com">
                    </otherwise>
                </priority-switch>
            </otherwise>
        </address-switch>
    </state>
    # if neither WLAN or 3G, deliver message to mailbox
    <otherwise>
        <deliver url="joe.cool@mailbox.provider2.com">
            <deliver \>
    </otherwise>
</state-switch>
</mmspl>
```

In the foregoing example, the recipient rules specify delivery based upon connectivity of the recipient 510B, as such may be indicated through the recipient's state information. In this regard, if the recipient is connected to a WLAN network 626 (i.e., <state is "WLAN">), the recipient rules specify immediate delivery of the media content to the recipient's email (i.e., "joe.cool@wlan.provider1.com"). If the recipient is connected to a 3G network 624 (i.e., <state is "3G">), however, the recipient rules specify that delivery of the media content is to be based upon a specific sending entity or priority of the media content.

More particularly, if the media content is from a sending entity 510A (i.e., recipient's wife) having a specific telephone number (i.e., address is "+11235552587"), the recipient rules specify immediate delivery of the media content to the recipient's telephone (i.e., "deliver phone='+13455553455'"). If the media content is not from the respective sending entity, the recipient rules specify that delivery be based upon a priority of the media content, as such may be specified in a sending entity rule. In this regard, if the multimedia message 515 is designated as "urgent," the recipient rules specify immediate delivery of text objects of the media content to the recipient's telephone. If the media content is not designated as "urgent," however, the media content is to be delivered to the mailbox email address (i.e., "joe.cool@mailbox.provider2.com"). If the recipient is not connected to either a WLAN network or a 3G network, however, as such may be indicated through the state information in the recipient rules, the recipient rules can specify delivering the media content to the recipient's mailbox email address for later retrieval.

Therefore, embodiments of the present invention provide an improved system, method and computer program product for the delivery of media content from a sending entity to at least one recipient. The system, method and computer program product of embodiments of the present invention provide greater control over the delivery of media content, as compared to conventional delivery techniques. In this regard, embodiments of the present invention allow senders, recipients, network operators and other such entities to define recipient rules, sending entity rules and/or network rules. Delivery of media content can then be subject to such rules. In this regard, embodiments of the present invention allow rules to be defined so as to facilitate fast, efficient and inexpensive delivery of media content.

In various advantageous embodiments, portions of the system and method of the present invention include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the MMS server 144 and/or the rule processor 170, as depicted in FIG. 1.

In this regard, FIGS. 1, 2 and 3 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving, at a network entity, a multimedia message from a sending entity and addressed to one or more recipients, wherein the multimedia message includes media content;
   determining, by the network entity, whether a recipient rule specified by at least one recipient of the one or more recipients exists; and
   responsive to a determination that the recipient rule exists, delivering the media content to the at least one recipient of the one or more recipients based upon the recipient rule.

2. The method according to claim 1, wherein the recipient rule is independent of the sending entity.

3. The method according to claim 1, comprising receiving the recipient rule from the at least one recipient of the one or more recipients prior to receiving the multimedia message.

4. The method according to claim 1, wherein the recipient rule comprises state information based upon a state of the at least one recipient of the one or more recipients.

5. The method according to claim 4, wherein the state information comprises network connectivity of the at least one recipient of the one or more recipients.

6. The method according to claim 5, further comprising:
   updating the state information when the network connectivity of the at least one recipient of the one or more recipients changes; and
   wherein delivering the media content comprises delivering the media content to the at least one recipient of the one or more recipients based upon the network connectivity.

7. The method according to claim 1, wherein the recipient rule is based upon at least one preference of the at least one recipient of the one or more recipients, and wherein delivering the media content comprises delivering the media content to the at least one recipient of the one or more recipients based upon the at least one preference.

8. The method according to claim 7, wherein the at least one preference comprises permitting delivery of the media content from specific sending entities.

9. The method according to claim 7, wherein the at least one preference comprises permitting delivery of the media content if the media content comprises audio content.

10. The method according to claim 7, wherein the at least one preference comprises permitting delivery of the media content if the media content comprises video content.

11. The method according to claim 7, wherein the at least one preference comprises permitting delivery of portions of the media content.

12. The method according to claim 11, wherein the portions of the media content comprise at least one of graphic portions, audio portions, text portions, and video portions.

13. The method according to claim 1, comprising processing the media content based upon the recipient rule before delivering the media content.

14. The method according to claim 13, wherein:
    processing the media content comprises transcoding at least a portion of the media content; and
    delivering the media content comprises delivering the transcoded portion of the media content.

15. The method according to claim 13, wherein:
    processing the media content comprises truncating at least a portion of the media content; and
    delivering the media content comprises delivering the truncated portion of the media content.

16. The method according to claim 1, further comprising:
    receiving, by the network entity, the recipient rule;
    storing the recipient rule in a storage location communicatively coupled to the network entity; and
    accessing the recipient rule from the storing location.

17. The method according to claim 16, wherein the storage location comprises a database.

18. A system comprising:
    a sending entity configured to transmit a multimedia message addressed to one or more recipients, wherein the multimedia message comprises media content; and
    a network entity configured to receive the transmitted multimedia message, determine whether a recipient rule specified by at least one recipient of the one or more recipients exists, and responsive to a determination that the recipient rule exists, deliver the media content to the at least one recipient of the one or more recipients based upon the recipient rule.

19. The system of claim 18, wherein the network entity is further configured to process the media content based upon the recipient rule before delivering the media content.

20. A computer program product comprising at least one non-transitory computer-readable storage medium having computer-readable program code portions stored therein, the computer-readable program code portions comprising:
    a first executable portion for receiving, at a network entity, a multimedia message from a sending entity and addressed to one or more recipients, wherein the multimedia message includes media content;
    a second executable portion for determining, by the network entity, whether a recipient rule specified by at least one recipient of the one or more recipients exists; and responsive to a determination that the recipient rule exists, delivering the media content to the at least one recipient of the one or more recipients based upon the recipient rule.

* * * * *